(12) United States Patent
Naveh et al.

(10) Patent No.: US 12,436,742 B2
(45) Date of Patent: Oct. 7, 2025

(54) PERFORMANCE ANALYSIS OF QUANTUM PROGRAMS

(71) Applicant: Classiq Technologies LTD., Tel Aviv (IL)

(72) Inventors: Amir Naveh, Haifa (IL); Yehuda Naveh, Tel-Aviv Yafo (IL); Ofek Kirzner, Haifa (IL); Shmuel Ur, Shorashim (IL); Ravid Alon, Givatayim (IL); Eyal Cornfeld, Ramat Gan (IL); Avi Elazari, Hod Hasharon (IL); Lior Gazit, Tel-Aviv (IL)

(73) Assignee: CLASSIQ TECHNOLOGIES LTD., Tel Aviv (IL)

( * ) Notice: Subject to any disclaimer, the term of this patent is extended or adjusted under 35 U.S.C. 154(b) by 179 days.

(21) Appl. No.: 17/929,703

(22) Filed: Sep. 4, 2022

(65) Prior Publication Data

US 2024/0078088 A1    Mar. 7, 2024

(51) Int. Cl.
*G06F 8/20*    (2018.01)
*G06N 10/80*    (2022.01)

(52) U.S. Cl.
CPC .............. *G06F 8/24* (2013.01); *G06N 10/80* (2022.01)

(58) Field of Classification Search
CPC .................................. G06F 8/24; G06N 10/80
See application file for complete search history.

(56) References Cited

U.S. PATENT DOCUMENTS

| | | | |
|---|---|---|---|
| 2019/0164076 A1* | 5/2019 | Kim ..................... | G06N 10/00 |
| 2019/0340532 A1* | 11/2019 | Ducore ................ | G06N 10/00 |
| 2020/0104739 A1* | 4/2020 | Sharma ................ | G06N 10/80 |
| 2020/0219003 A1* | 7/2020 | Gazda .................. | G06F 30/398 |
| 2021/0192113 A1* | 6/2021 | Nam .................... | G06N 10/00 |
| 2021/0224049 A1* | 7/2021 | Haener ................ | G06F 8/41 |
| 2022/0084085 A1* | 3/2022 | Rigetti ............... | G06Q 30/0283 |
| 2022/0114313 A1* | 4/2022 | Zhang .................. | G06F 30/30 |
| 2022/0358390 A1* | 11/2022 | Ruedinger ............. | G06F 8/41 |
| 2023/0102347 A1* | 3/2023 | Gutierrez .............. | G06N 10/00 |
| | | | 716/116 |

(Continued)

OTHER PUBLICATIONS

Nguyen, Thien, et al. "Quantum circuit transformations with a multi-level intermediate representation compiler." arXiv preprint arXiv:2112.10677 (2021). (Year: 2021).*

(Continued)

*Primary Examiner* — Bradley A Teets
*Assistant Examiner* — Joanne G Macasiano

(57) ABSTRACT

A method, system, and product for performance analysis of quantum programs. A quantum program comprises plurality of code artifacts and is compilable into a quantum circuit. A representation of the quantum circuit that implements the quantum program is obtained. The quantum circuit manipulates a plurality of qubits over a plurality of cycles using a plurality of quantum gates. The representation of the quantum circuit includes circuit components. A performance measurement of a code artifact of the quantum program is automatically computed based on one or more circuit components that are mapped to the code artifact by a component to code mapping. The component to code mapping maps circuit components of the representation to the quantum circuit to respective code artifacts of the quantum program.

20 Claims, 6 Drawing Sheets

(56) References Cited

U.S. PATENT DOCUMENTS

| | | | | |
|---|---|---|---|---|
| 2023/0143072 A1* | 5/2023 | Flöther | ........... | G06N 10/00 |
| | | | | 706/12 |
| 2023/0259802 A1* | 8/2023 | Klimov | ........... | G06N 3/084 |
| | | | | 706/62 |
| 2023/0419378 A1* | 12/2023 | Durazzo | ........... | G06Q 30/0627 |

OTHER PUBLICATIONS

Smelyanskiy, Mikhail, Nicolas PD Sawaya, and Alan Aspuru-Guzik. "qHIPSTER: The quantum high performance software testing environment." arXiv preprint arXiv:1601.07195 (2016). (Year: 2016).*

Tang, Wei, et al. "Cutqc: using small quantum computers for large quantum circuit evaluations." Proceedings of the 26th ACM International conference on architectural support for programming languages and operating systems. 2021. (Year: 2021).*

Javadiabhari, Ali, et al. "ScaffCC: A framework for compilation and analysis of quantum computing programs." Proceedings of the 11th ACM Conference on Computing Frontiers. 2014. (Year: 2014).*

* cited by examiner

PERFORMANCE ANALYSIS OF QUANTUM PROGRAMS

TECHNICAL FIELD

The present disclosure relates to quantum computing in general, and to performance analysis of a quantum program, in particular.

BACKGROUND

Quantum computing is a computational paradigm that is fundamentally different from classic computing. In contrast to classic computing, which utilizes bits, quantum computing utilizes qubits. The qubits have unique features, as each qubit can be in superposition, several qubits can be entangled, and all operations on qubits besides measurement, referred to as quantum gates, must be reversible. Temporarily computed values are stored on additional helper qubits, referred to as auxiliary qubits.

In software engineering, profiling ("program profiling", "software profiling") is a form of dynamic program analysis that measures performance metric, such as memory utilization or computation time, or the like, during execution of the program. Most commonly, profiling information serves to aid program optimization, and more specifically, performance engineering.

Profiling of classic software is achieved by instrumenting the program with instructions that log, during execution, events related to the various code artifacts of the classic program. For example, the value of the program counter may be checked periodically to determine the percentage of execution time each instructions took, thereby providing useful hints into the portions of the program that consume significant amount of computational resources, and in which code optimization may provide a substantial impact on the overall performance of the program.

BRIEF SUMMARY

One exemplary embodiment of the disclosed subject matter is a method comprising: obtaining a quantum program, wherein the quantum program comprises a plurality of code artifacts, the quantum program is compilable into a quantum circuit; obtaining a representation of the quantum circuit that implements the quantum program, the quantum circuit manipulates a plurality of qubits over a plurality of cycles using a plurality of quantum gates, the representation of the quantum circuit includes circuit components; obtaining a component to code mapping, the component to code mapping maps circuit components of the representation to the quantum circuit to respective code artifacts of the quantum program; automatically computing a performance measurement of a code artifact of the quantum program based on one or more circuit components that are mapped to the code artifact by the component to code mapping; and outputting the performance measurement of the code artifact.

Another exemplary embodiment of the disclosed subject matter is an apparatus comprising a processor and coupled memory, said processor being adapted to perform: obtaining a quantum program, wherein the quantum program comprises a plurality of code artifacts, the quantum program is compilable into a quantum circuit; obtaining a representation of the quantum circuit that implements the quantum program, the quantum circuit manipulates a plurality of qubits over a plurality of cycles using a plurality of quantum gates, the representation of the quantum circuit includes circuit components; obtaining a component to code mapping, the component to code mapping maps circuit components of the representation to the quantum circuit to respective code artifacts of the quantum program; automatically computing a performance measurement of a code artifact of the quantum program based on one or more circuit components that are mapped to the code artifact by the component to code mapping; and outputting the performance measurement of the code artifact.

Yet another exemplary embodiment of the disclosed subject matter is a computer program product comprising a non-transitory computer readable medium retaining program instructions, which program instructions when read by a processor, cause the processor to perform a method comprising: obtaining a quantum program, wherein the quantum program comprises a plurality of code artifacts, the quantum program is compilable into a quantum circuit; obtaining a representation of the quantum circuit that implements the quantum program, the quantum circuit manipulates a plurality of qubits over a plurality of cycles using a plurality of quantum gates, the representation of the quantum circuit includes circuit components; obtaining a component to code mapping, the component to code mapping maps circuit components of the representation to the quantum circuit to respective code artifacts of the quantum program; automatically computing a performance measurement of a code artifact of the quantum program based on one or more circuit components that are mapped to the code artifact by the component to code mapping; and outputting the performance measurement of the code artifact.

Optionally, said automatically computing the performance measurement is performed without executing the quantum circuit.

Optionally, the representation of the quantum circuit is a functional-level representation of the quantum circuit.

Optionally, the representation of the quantum circuit is an unexecutable representation of the quantum circuit.

Optionally, the code artifact of the quantum program is included in a loop in the quantum program, the representation of the quantum circuit comprises a plurality of circuit components representing the code artifact in different iterations of the loop, wherein the performance measurement is computed based on the plurality of circuit components that represent the code artifact in the different iterations of the loop.

Optionally, during the compilation of the quantum program, the component to code mapping is created.

Optionally, the quantum program is compiled to obtain the representation of the quantum circuit, wherein said compiling comprises creating the component to code mapping.

Optionally, compiling the quantum program to obtain an intermediate representation of the quantum circuit; transpiling the intermediate representation to obtain the representation of the quantum circuit; wherein said obtaining the component to code mapping includes: obtaining a first mapping created during the compilation of the quantum program, the first mapping maps circuit components in the intermediate representation and respective code artifacts of the quantum program; obtaining a second mapping created during the transpilation of the intermediate representation of the quantum circuit, the second mapping maps circuit components in the representation of the quantum circuit and respective circuit components in the intermediate represent; and aggregating the first mapping and the second mapping.

Optionally, a memory retains a compiler and a transpiler, the compiler is configured to compile the quantum program, thereby obtaining an intermediate representation of the quantum circuit, the transpiler is configured to transpile the intermediate representation, thereby obtaining the representation of the quantum circuit.

Optionally, the performance measurement of the code artifact of the quantum program is based on at least one of: a number of gates in the quantum circuit that correspond to the code artifact; a number of gates of a specific type in the quantum circuit that correspond to the code artifact; a number of qubits allocated in the quantum circuit for the code artifact; a depth of a sub-circuit in the quantum circuit that corresponds to the code artifact; a number of auxiliary qubits that are used and subsequently cleaned, by a portion of the quantum circuit that is associated with the code artifact; a number of auxiliary qubits that are used and not cleaned, by the portion of the quantum circuit that is associated with the code artifact; an error measurement attributed to the portion of the quantum circuit that is associated with the code artifact; whether the portion of the quantum circuit that corresponds to the code artifact affects a length of a critical path of the quantum circuit.

Optionally, the performance measurement of a code artifact of the quantum program is further based on one or more additional circuit components that are associated with the one or more circuit components that are mapped directly to the code artifact of the quantum program.

Optionally, the one or more additional circuit components comprise at least one of: error correction sub-circuit with respect to a qubit utilized by the one or more circuit components that are mapped directly to the code artifact of the quantum program; swapping sub-circuit with respect to a qubit utilized by the one or more circuit components that are mapped directly to the code artifact of the quantum program; and uncomputation sub-circuit with respect to an auxiliary qubit utilized by the one or more circuit components that are mapped directly to the code artifact of the quantum program;

Optionally, said outputting includes displaying the performance measurement to a programmer; wherein said method further comprises: receiving a modified quantum program from the programmer, whereby the programmer potentially improves the performance measurement while retaining functionality of the quantum program.

Optionally, the quantum circuit is a parametric quantum circuit, wherein said automatically computing the performance measurement of the code artifact comprises performing a plurality of performance measurements with respect to a plurality of different parameter values, whereby obtaining a plurality of measurements, wherein the performance measurement of the code artifact is computed based on an aggregation of the plurality of measurements.

Optionally, the quantum program is part of an hybrid computer program comprising a classic program and the quantum program, wherein the classic program is configured to dynamically generate a version of the quantum program, wherein performance measurements of the code artifact are computed individually to each quantum program that is generated by the classic program, whereby obtaining a plurality of measurements, wherein the performance measurement of the code artifact is computed based on an aggregation of the plurality of measurements.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
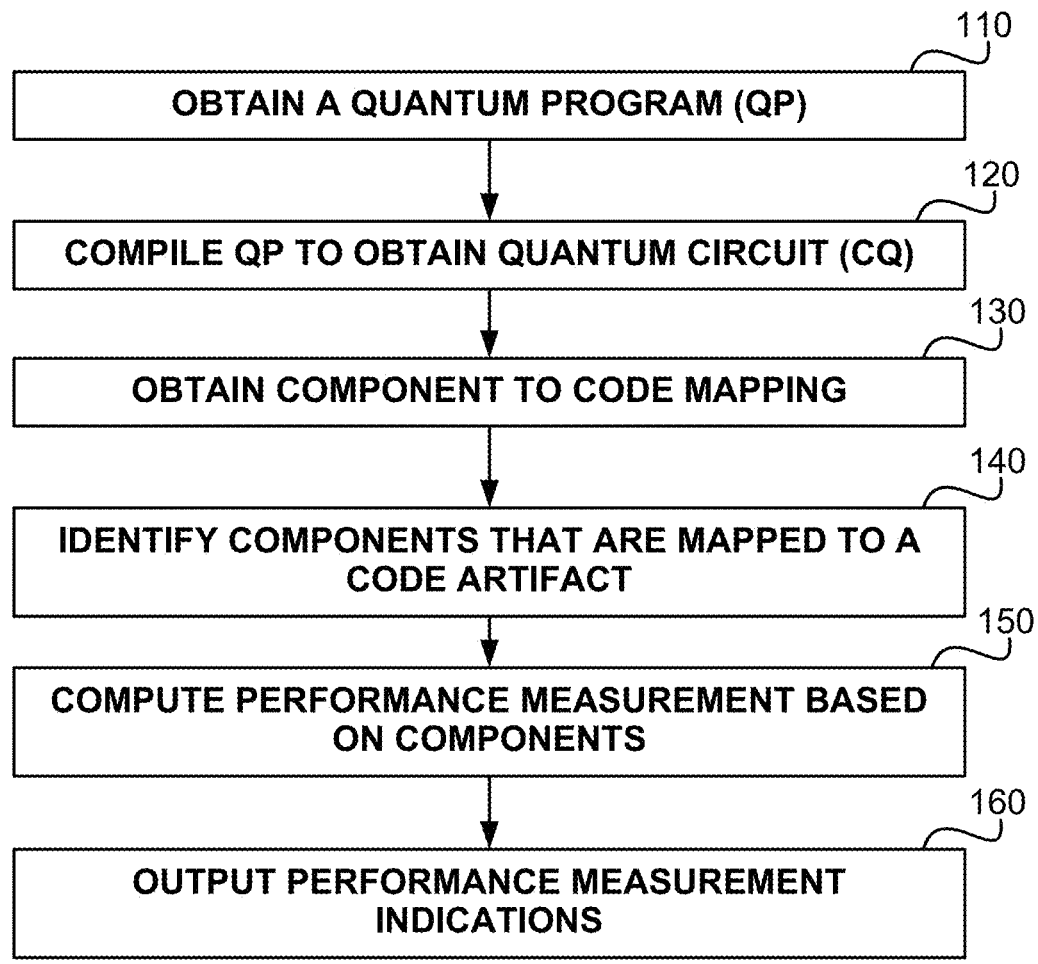
FIG. 1A illustrates an exemplary flowchart diagram of a method, in accordance with some exemplary embodiments of the disclosed subject matter.

Various technologies relate to generation and development of quantum circuits, such as, for example, disclosed in any of U.S. Pat. No. 11,288,589, entitled "QUANTUM CIRCUIT MODELING", published Mar. 29, 2022, U.S. Pat. No. 11,294,797, entitled "DEBUGGER FOR QUANTUM COMPUTERS", published Apr. 5, 2022, U.S. patent application Ser. No. 17/354,453, entitled "EFFICIENT EXECUTION OF QUANTUM PROGRAMS", filed Jun. 22, 2021, U.S. patent application Ser. No. 17/354,504, entitled "CONTROLLED PROPAGATION IN QUANTUM COMPUTING", filed Jun. 22, 2021, U.S. patent application Ser. No. 17/450,584, entitled "FUNCTIONAL-LEVEL PROCESSING COMPONENT FOR QUANTUM PROGRAMS", filed Oct. 12, 2021, U.S. patent application Ser. No. 17/499,046, entitled "CSP-BASED SYNTHESIS OF A QUANTUM CIRCUIT", filed Oct. 12, 2021. U.S. application Ser. No. 17/649,576, entitled "CONTROLLED PROPAGATION OF INPUT VALUES IN QUANTUM COMPUTING", filed Feb. 1, 2022, U.S. patent application Ser. No. 17/450,583, entitled "PROVISIONING FUNCTIONAL-LEVEL INFORMATION TO BE UTILIZED IN GATE-LEVELPROCESSING OF QUANTUM CIRCUITS", U.S. application Ser. No. 17/499,063, entitled "RE-GENERATION OF A GATE-LEVEL QUANTUM CIRCUIT BASED ON GATE-LEVEL ANALYSIS", filed Oct. 12, 2021, U.S. patent application Ser. No. 17/499,082, entitled "DYNAMIC SYNTHESIS OF GATE-LEVEL IMPLEMENTATIONS OF FUNCTIONAL BLOCKS IN QUANTUM CIRCUITS", filed Oct. 12, 2021, U.S. application Ser. No. 17/648,691, entitled "AUXILIARY QUBITS ANALYSIS BASED ON PARTIAL COMPILATION OF QUANTUM PROGRAMS", filed Jan. 24, 2022, U.S. patent application Ser. No. 17/722,703, entitled "DETERMINING QUANTUM ERROR CORRECTION SCHEMES", filed Apr. 18, 2022, U.S. patent application Ser. No. 17/723,561, entitled "DETERMINING DYNAMIC QUANTUM ERROR CORRECTION SCHEMES", filed Apr. 19, 2022, U.S. patent application Ser. No. 17/720,655, entitled "SELECTING PHYSICAL QUBITS FOR QUANTUM ERROR CORRECTION SCHEMES", filed Apr. 14, 2022, U.S. patent application Ser. No. 17/664,742, entitled "AUXILIARY QUBIT DETECTION IN QUANTUM CIRCUITS", filed May 24, 2022, and U.S. patent application Ser. No. 17/752,282, entitled "AUXILIARY QUBIT VERIFICATION IN QUANTUM CIRCUITS", filed May 24, 2022, all of which are incorporated by reference in their entirety without giving rise to disavowment.

One technical problem dealt with by the disclosed subject matter is to provide for performance analysis tool for a quantum program.

In accordance with some embodiments, the user may develop the quantum circuit by writing the code of a quantum program. In many cases, the code may be relatively short. The code may be written in a high-level programming language. The code itself may be hardware agnostic and may not relate to any specific hardware. The quantum program may include various artifacts including code lines, functions, loop statements, conditional statements, or the like. In some exemplary embodiments, a front-end compiler may compile a quantum program into a quantum circuit. The quantum circuit that is created may be hardware specific. Additionally or alternatively, the quantum circuit may be much larger than the quantum program, such as by orders of multitudes. For example, a quantum program of 500 lines, may be translated into a circuit using 5000 qubits and having a depth of 100,000 cycles. It may be desired that the programmer may glean insight into performance aspects of his quantum program, in its final or intermediate form, indicating which elements affect performance mostly and may justify the investment of resources to enhance performance.

In some cases, the programmer may program a classic program, and an automated tool may automatically generate a quantum program (in whole or in part, e.g., a hybrid program) based thereon. In such cases, it may be desired to provide performance related feedback to the automated tool to allow for an improved generation of the quantum program, to select a variation between potential several alternative variations that are automatically generated, or the like. In some cases, performance feedback regarding the quantum program may be provided to the programmer, enabling her to decide whether to execute the quantum program or utilize an alternative classic, non-quantum, implementation of the same classic program.

In some cases, a single code element in the quantum program may appear several times in the quantum circuit. For example, a single code element may appear in a logical quantum circuit multiple times due to being included within a loop. The loop may be unrolled in the logical quantum circuit, and in each rolled iteration there may be a sub-circuit that implements the single code element. In some cases, the sub-circuit may be different in different iterations. For example, the single code element may be a function, and in each iteration the function may potentially be implemented differently, using a different gate-level sub-circuit that implements the same functionality of the function. In some cases, the function implementation may be generated on-the-fly. Additionally or alternatively, the function implementation may be obtained from a function library, such as depicted, for example in U.S. patent application Ser. No. 17/450,584, entitled "FUNCTIONAL-LEVEL PROCESSING COMPONENT FOR QUANTUM PROGRAMS", filed Oct. 12, 2021, which is hereby incorporated in reference in its entirety without giving rise to disavowment.

As another example, a single code element may appear in a physical quantum circuit multiple times due to the use of error correction mechanisms. In some cases, error correction may be applied on a logical qubit by utilizing multiple physical qubits in the physical quantum circuit to represent its value. In such a case, the single code element has several representations in the physical quantum circuit itself.

In some exemplary embodiments, the quantum program may be compiled and processed to provide a quantum circuit. In some exemplary embodiments, there may be a functional-level representation of the quantum circuit, a gate-level representation of the quantum circuit, a functional representation of the quantum circuit, a physical representation of the quantum circuit, a representation of an executable quantum circuit, or the like. As an example, the quantum program may be compiled to generate a directed acyclic graph having functional blocks or another functional-level representation of a quantum circuit. The functional-level representation may be processed to generate a hardware agnostic gate-level representation of the quantum circuit. The gate-level representation may be transpiled to generate a hardware-specific executable quantum circuit. The hardware-specific executable quantum circuit may or may not introduce error correction schemes, such as by applying more than a single physical qubit to represent a logical qubit.

One technical solution of the disclosed subject matter is to map components in the quantum circuit to their origin in the quantum program. In some exemplary embodiments, the front-end complier may create a mapping from the quantum circuit to the quantum program. As can be appreciated a code artifact (e.g., function, line of code, or the like) may be represented in multiple places in the quantum circuit. For example, a code artifact of func(x,y,z), which invokes a function func with the inputs x,y and yields output z, may be inside a loop and may be implemented two or more times in the quantum circuit. In each loop iteration, a different implementation that achieves the functionality of func may be used. For example, in a first iteration, an implementation that uses three qubits and requires ten cycles may be selected from a library, while in a second iteration a different implementation may be selected, such as using more qubits but requiring less cycles. In some cases, the different implementations may be selected from pre-existing implementations in a library, may be generated on the fly, or the like. The selection or generation may be performed based on a Constraint Satisfaction Problem (CSP) defining different constraints that the circuit must uphold, defining soft constraints that the circuit may uphold, or the like. In some cases, the implementation may be selected or generated while attempting to optimize a target function, such as minimizing a number of qubits utilized, minimizing estimated error, or the like.

In some exemplary embodiments, different components or portions of the circuit may be attributed using the mapping to specific code artifacts. Using the mapping, performance aspects of each code artifact may be measured. As an example, a code line in the quantum program may be attributed to a set of gates, allocation of a set of qubits, utilization of a set of auxiliary qubits (some of which may or may not be cleaned), or the like. Performance measurements, according to one or more metrics, of each code artifact may be computed.

In some exemplary embodiments, the quantum program may be translated to an intermediate circuit representation, such as functional-level representation of the quantum circuit. The analysis may be performed with respect to the intermediate circuit representation. Additionally or alternatively, the intermediate representation may be processed to synthesize or otherwise create a more detailed representation of the quantum circuit. For example, a back-end complier may be used to add error correction, to add swap chain to solve connectivity issues, and any other addition that customizes the quantum circuit for a target hardware platform. In some exemplary embodiments, the back-end compiler may map portions in the intermediate representation with a portion of the produced quantum circuit, and such mapping may be used to identify resources allocated for and performance issues associated with the circuit components of the intermediate representation.

It is noted that various levels of abstractions of the quantum circuit may exist and the disclosed subject matter is not limited to specific set of representations. As an example, a quantum program may be compiled into a functional-level representation of a logical quantum circuit. In some exemplary embodiments, the functional-level representation of the logical quantum circuit may be processed to generate a gate-level representation of the logical quantum circuit. In some exemplary embodiments, the gate-level representation of the logical quantum circuit may be compiled or transpiled into an executable physical quantum circuit. The disclosed subject matter may utilize one or more mappings from lower-level abstraction levels to the upmost level of abstraction of interest, to compute performance measurements of artifacts in the upmost level of abstraction of interest (be that whichever level of abstraction the programmer is interested in).

In some exemplary embodiments, a component in the quantum circuit may be mapped to a code artifact. In some cases, a component may be mapped to the code artifact that caused the component to be introduced into the quantum circuit. In some exemplary embodiments, the mapping may be based on direct or indirect association to the code artifact. For example, an input or output qubit that are utilized by a sub-circuit implementing a function may be attributed to the function. As another example, physical error correction may be attributed to the logical qubit it protects, and accordingly to the same code artifact to which the logical qubit is mapped. As yet another example, swap chains may be attributed to the code artifact that is mapped to a relevant gate. In some exemplary embodiments, swap chains may be implemented in view of specific hardware connectivity and a given assignment of physical qubits. In some exemplary embodiments, swap chains that are implemented before a gate (which may be referred to as the target gate) may be attributed to the same code artifact that is associated with the target gate. This may be explained as the swap chain was implemented in order to allow the target gate to operate correctly. Additionally or alternatively, the same swap chain may be attributed to the same code artifact that is associated with the gate that outputted the relevant value (which may be referred to as the source gate). This may be explained as the swap chain was implemented due to the operation of that source gate. Additionally or alternatively, the swap chains may be attributed to both the target and source gates (e.g., each being considered as attributing to the entire swap chains, each being considered as attributing to an equal share of the entire swap chains, or the like).

In some exemplary embodiments, auxiliary qubits and computation circuits may be mapped to code artifacts. In some exemplary embodiments, auxiliary qubits may be mapped to the functions that used such auxiliary qubits. Additionally or alternatively, the auxiliary qubits may be mapped to the functions that used such auxiliary qubits in a manner preventing reuse of the auxiliary qubits (e.g., without cleaning the auxiliary qubit). In some exemplary embodiments, uncomputation sub-circuit that clean an auxiliary qubit may be mapped to relevant code artifacts.

Consider a function F which utilizes auxiliary aux. Cleanup operation is performed using uncomputation sub-circuit ($F^1$). The auxiliary aux is then utilized by function G. In some exemplary embodiments, the uncomputation sub-circuit in the quantum circuit may be attributed to F, as due to the operation of F, the cleanup was required. Additionally or alternatively, the uncomputation sub-circuit in the quantum circuit may be attributed to G, as due to the fact that G required an auxiliary qubit, aux was actually cleaned. In some exemplary embodiments, aux was selected from the auxiliary pool, and other functions may have also affected the state of the auxiliary pool. For example, other functions may ($F_2, F_3, \ldots, F_N$) are also responsible for the state of the auxiliary pool when the G requires an auxiliary qubit, as each such function may have also obtained an auxiliary qubit from the pool. Such functions may have caused a limited "supply" of auxiliary qubits that required to clean up aux. As such, the uncomputation sub-circuit may be attributed, in equal parts to all such functions that contributed to the state of the auxiliary pool when G required the auxiliary qubit, and due to their usage of auxiliary qubits, the aux qubit was cleaned instead of taking a fresh cleaned qubit from the auxiliary pool. Additionally or alternatively, the uncomputation sub-circuit may be attributed, in unequal parts to all such functions that contributed to the state of the auxiliary pool when G required the auxiliary qubit, and due to their usage of auxiliary qubits, the aux qubit was cleaned instead of taking a fresh cleaned qubit from the auxiliary pool. As one example, each function may be attributed a prorate part based on the number of auxiliary qubits utilized thereby. In some exemplary embodiments, aux was selected from the auxiliary pool to be used by G, but other functions may have selected the same auxiliary qubit to be used by them. The set of functions that required an auxiliary qubit after aux is cleaned may represent the "demand" for clean auxiliary qubits from the auxiliary pool. In some exemplary embodiments, the uncomputation sub-circuit may be attributed to all functions that required an auxiliary qubit after the uncomputation sub-circuit is implemented, in equal or non-equal parts.

In some exemplary embodiments, for each code artifact, performance measurement may be computed. In some exemplary embodiments, different granularity levels may be implemented such as instruction, function, file, or the like. The performance measurement may be computed based on resources that are utilized to implement the code artifact in the quantum circuit. For example, the performance measurement may be based on any of the following metrics: a number of gates that are mapped to the code artifact, a composition of types of gates that are mapped to the code artifact (e.g., how many gates of each type), a depth of the mapped components, an area of the mapped components (e.g., depth multiplied by the number of qubits), a number of qubits utilized by the code artifact, a number of qubits utilized by the code artifact that may not be reused thereafter, memory resources utilized by the component (e.g., auxiliary qubits), cleaning operations performed with respect to the component, error measurements, swap chains, or the like. In some exemplary embodiments, a performance metric that is associated with the critical path may be utilized. In some exemplary embodiments, a critical path may be the longest path of the logic in the quantum circuit, that if shortened, the depth of the quantum circuit is decreased. Hence, a programmer may invest more resources in improving efficiency of a code artifact that is on the critical path and has the potential of decreasing the depth of the entire circuit, than a code artifact that, even if shortened, would not affect the depth of the circuit itself. In some exemplary embodiments, the disclosed subject matter may indicate whether a code artifact affects the critical path.

It is noted that some cases, there may be circuit components that are generated and added downstream during compilation or transpilation. Some generated components may be added directly to support the functionality of a specific code artifact. However, some generated components may be generated and utilized generally without being attributed to a specific code artifact. For example, some circuit components may implement general memory management functionality. If the circuit component is not attributable to a specific upper-level element, its performance impact may be disregarded.

In some exemplary embodiments, the output of the disclosed subject matter may be indications of performance impact of one or more code artifacts on the quantum circuit. In some exemplary embodiments, the quantum program may be annotated with the performance impact an analyzed code artifact has on the quantum circuit. The performance impact may be determined using the mapping. Additionally or alternatively, the performance analysis may be performed statically and without executing the quantum circuit on a quantum computer or simulator thereof.

In some exemplary embodiments, the quantum circuit may be a parametric quantum circuit, and different parameter values may yield different performance impact. In some exemplary embodiments, the disclosed subject matter may perform a plurality of performance measurements, each for a quantum circuit having a different parameter value. The performance impact of the quantum program may be determined based on an aggregation of the plurality of measurements. For example, an average impact may be presented based on the different impact for different parameter values. Additionally or alternatively, the minimal and maximal impacts may be presented to the user. Additionally or alternatively, any statistical or other aggregative functions may be implemented on the series of performance values measured for a single code artifact and utilized to aggregate the value to a performance impact outputted to the user.

In some exemplary embodiments, a hybrid computer program in which a classic and quantum programs are interconnected may be analyzed. The classic program may be configured, when executed, to generate the quantum program. In some exemplary embodiments, performance measurements of the code artifacts may be computed individually to each quantum program that is generated by the classic program. In some exemplary embodiments, aggregation of different iterations may be utilized to provide impact insights into code artifacts of a template quantum program that is utilized by the classic program to generate the quantum programs. In some exemplary embodiments, multiple executions of the hybrid computer program may be performed. Hill climbing or similar iterative process may be implemented in order to compute performance in different rounds.

In some exemplary embodiments, based on the outputted indications, a programmer may modify her code, and improve the performance of the quantum program. In some cases, the programmer may improve efficiency of a code artifact that has substantially high impact on the performance of the entire quantum program, such as affecting the depth of the program, associated with substantially large computation, utilizing a large number of qubits and memory resources, utilizing many physical qubits, causing the use of many swap chains, or the like.

One technical effect obtained by the disclosed subject matter is providing performance insights to quantum programmers regarding their quantum program. The performance is measured with respect to lower-level, more concrete and less abstract, version of the quantum program, enabling the programmer to potentially improve performance of the quantum program, without diving into the lower-level version itself.

The performance measurements and insights relate to quantum-related resources: qubits, circuit depth, gates, or the like, and are measured without affecting the performance of the executed program. As opposed to classical profiling tools, which may add overhead to the execution, and thus adversely affect performance, the disclosed subject matter provides for a non-intrusive performance measurement that does not affect the actual execution of the target quantum program.

Another technical effect obtained by the disclosed subject matter is providing quantum program performance measurement without executing the quantum program (e.g., the executable quantum circuit that is the outcome of the compilation and/or transpilation of the quantum program). As performance is measured in a static manner, it may be measured using a classic computer and without requiring the use of a quantum computer.

Yet another technical effect obtained by the disclosed subject matter is provisioning of performance insights regarding parametric quantum program, which may differ depending on different parameter valuations, and regarding hybrid computer programs that integrate classic and quantum computing.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A, showing an exemplary flowchart diagram of a method, in accordance with some exemplary embodiments of the disclosed subject matter.

On Step 110, a quantum program (QP) may be obtained. The quantum program may be a program that was developed in a quantum programming language. In some exemplary embodiments, the quantum program may comprise code artifacts, such as but not limited to code files, functions, instructions, or the like. In some exemplary embodiments, a code artifact may represent an operation that is implemented in a single cycle (e.g., single-cycle code artifact) or in multiple cycles (e.g., multi-cycle code artifact). In some exemplary embodiments, there may be at least one code artifact that is a multi-cycle code artifact in the quantum program. In some exemplary embodiments, a code artifact may manipulate a single qubit (e.g., a single-qubit code artifact) or a plurality of qubits (e.g., a multi-qubit code artifact). In some exemplary embodiments, there may be at least one code artifact that is a multi-qubit code artifact in the quantum program. In some exemplary embodiments, a code artifact may be implemented using a single quantum gate (e.g., a single-gate code artifact) or using a plurality of quantum gates (e.g., a multi-gate code artifact). In some exemplary embodiments, there may be at least one code artifact that is a multi-gate code artifact in the quantum program. In some exemplary embodiments, a code artifact may be implemented using auxiliary qubits, using swap chains, using error correction schemes, or the like. In some exemplary embodiments, the quantum program may comprise at least one code artifact that is a multi-cycle, multi-gate, multi-qubit code artifact.

For simplicity and clarity, the disclosed subject matter may exemplify the code artifact as a function $func(q_{in}^1 \ldots q_{in}^n, q_{out}^1 \ldots q_{out}^k)$. func may be a function having some predetermined functionality. func may receive input values using a set of n qubits $(q_{in}^1, \ldots, q_{in}^n)$. func may provide output values using a set of k qubits $(q_{out}^1, \ldots q_{out}^k)$. In some exemplary embodiments, k may or may not be equal to n. As can be appreciated, assuming n+k>1, such code artifact is surely a multi-qubit code artifact. Additionally or alternatively, func may be a multi-gate and multi-cycle code artifact.

In some exemplary embodiments, the quantum program may be a program that is being analyzed. Additionally or alternatively, the quantum program may be a program that is being developed by a programmer. In some exemplary embodiments, the quantum program may be obtained from an Integrated Development Environment (IDE), from a code repository, or from other platforms or tools used by the programmer.

On Step 120, the quantum program may be compiled to generate a quantum circuit. In some exemplary embodiments, the compilation may be performed using a plurality of compilation/transpilation tools. For example, the quantum program may be compiled into an intermediate quantum circuit, and transpiled into the quantum circuit. In some exemplary embodiments, the quantum circuit may be a logical quantum circuit, a physical quantum circuit, an executable quantum circuit, a functional-level quantum circuit, a gate-level quantum circuit, or the like.

On Step 130, a component to code mapping may be obtained. The component to code mapping may be generated by the compiler/transpiler utilized in Step 120. In some exemplary embodiments, the compiler/transpiler may generate the component to code mapping during its operation. For example, when processing the code artifact of the quantum program, the compiler may update the component to code mapping to include any component that is introduced into the quantum circuit due to the code artifact.

In some exemplary embodiments, any qubit that is assigned to be utilized for implementing func may be added to the component to code mapping as being a component that is associated with the func code artifact. Additionally or alternatively, any auxiliary qubit that is utilized to implement func may be added as a component that is mapped to the func code artifact in the component to code mapping. Additionally or alternatively, any gate utilized to implement func may be added, as a component that is mapped to the func code artifact, to the component to code mapping. Additionally or alternatively, swap chains, error correction schemes or other components introduced to the quantum circuit to assist in implementing func may be added to the component to code mapping as being mapped to the func code artifact.

In some exemplary embodiments, some circuit components may be attributed to a code artifact due to their respective association with other components that are mapped directly to the func code artifact. In some exemplary embodiments, an error correction sub-circuit that is implemented with respect to a qubit utilized by the circuit components that are mapped directly to func may also be mapped to func. Additionally or alternatively, a swapping sub-circuit with respect to a qubit utilized by the circuit components that are mapped directly to func may also be mapped to func. Additionally or alternatively, an uncomputation sub-circuit with respect to an auxiliary qubit utilized by the circuit components that are mapped directly to func may also be mapped to func. In some exemplary embodiments, a same component may be mapped in whole or in part to several code artifacts. For example, an uncompute sub-circuit may be attributed to a function code artifact of other functions that removed auxiliary qubits from the auxiliary pool and have not returned them (e.g., effectively responsible for the need to clean a dirty auxiliary qubit on the "supply" side), to a function code artifact of other functions that required the use of an auxiliary qubit after the uncompute sub-circuit is implemented (e.g., effectively responsible for the need to clean a dirty auxiliary qubit on the "demand" side), or the like. Each such code artifact may be considered as mapped in an equal share to the uncompute sub-circuit. For example, assuming there are five such code artifacts, each may be attributed to 20% of the uncompute sub-circuit. Additionally or alternatively, each of the five code artifacts may be considered as responsible for 100% of the uncompute sub-circuit (e.g., resulting in the same component being attributed five times in performance measurements)

In some exemplary embodiments, instead of being mapped to func in the component to code mapping, such components may be attributed to the code attribute when the mapping is utilized, such as during the performance measurement analysis.

On Step 140, using the component to code mapping, each component that is mapped to a target code artifact may be identified. In some exemplary embodiments, a single code artifact in the quantum program may be mapped to several separate components in the quantum circuit. For example, a/func may be invoked within a loop in the quantum program. The quantum circuit may unroll the loop and provide several components, each implementing func in a different iteration, potentially using different sub-circuits. In some exemplary embodiments, the analysis may be performed with respect to a single target code artifact. The programmer may indicate which target code artifact is to be analyzed.

In some exemplary embodiments, a component may be mapped to several code artifacts, such as in case several code artifacts contributed to the requirement of adding the component.

In some exemplary embodiments, the components may be identified based on the mapping. Additionally or alternatively, the components may be identified although they are not directly mapped to the code artifact. In some cases, a component may be associated with another component that is directly mapped to the code artifact. Based on such indirect association, the component may be attributed, in whole or in part, to the code artifact.

Additionally or alternatively, the analysis may be performed with respect to a set of target code artifacts, such as a set identified by the programmer, a set covering specific types of code artifacts, all code artifacts of the quantum program, all code artifacts of a specific type (e.g., all functions, all files, all instructions), or the like. In such a case, Steps 140-150 may be iteratively performed, each time with respect to a different target code artifact.

On Step 150, a performance measurement for the single target code artifact may be computed, based on the components identified on Step 140. In some exemplary embodiments, the performance may be measured without executing the quantum circuit. The performance may be computed using a classic computer, and without activating a quantum computer capable of executing the quantum circuit. In some embodiments, the quantum circuit may be unexecutable, such as if the quantum circuit may be an intermediate form that needs to be compiled to an executable form. In some exemplary embodiments, the performance measurement may be based on static analysis of the components. As an example, the performance measurement may be based on any one or more of the following: a number of gates in the components or associated components, a number of gates of a specific type in the components or associated components, a depth of a sub-circuit in the quantum circuit that corresponds to the code artifact; a number of qubits allocated in the quantum circuit for the components, a number of auxiliary qubits that are used and subsequently cleaned, by the components or associated components, an error measurement attributed to the components or associated components, or the like. In some exemplary embodiments, the performance measurement may be based on whether a component or associated component that corresponds to the code artifact affects a length of a critical path of the quantum circuit. In some exemplary embodiments, in case the code artifact is considered as affecting the critical path of the quantum circuit, its performance may be considered as affecting the overall performance of the quantum circuit.

On Step 160, performance measurement indications may be outputted. In some exemplary embodiments, the indications may be provided to the programmer, providing her with performance related insights to her quantum program. In some exemplary embodiments, the quantum program may be displayed to the programmer with annotations visualizing the performance measurement indications in association with the different code artifacts.

Figure 1B:
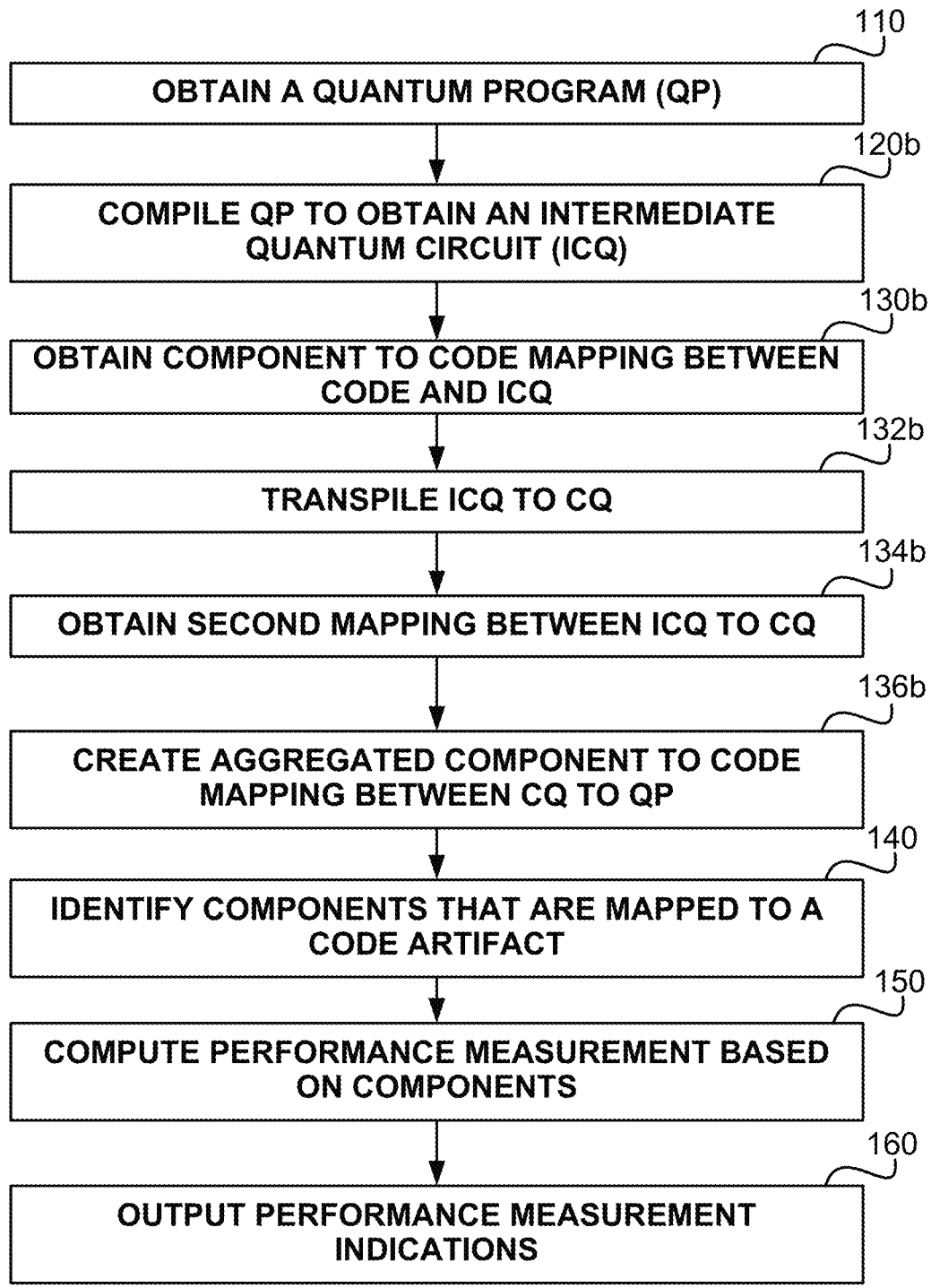
FIG. 1B illustrates an exemplary flowchart diagram of a method, in accordance with some exemplary embodiments of the disclosed subject matter.

Referring now to FIG. 1B, showing an exemplary flowchart diagram of a method, in accordance with some exemplary embodiments of the disclosed subject matter. FIG. 1B may exemplify that the analysis may be performed with respect to different level of abstractions of the quantum circuit.

On Step 120b, the quantum program may be compiled, such as using a compiler, to obtain an intermediate quantum circuit. The intermediate quantum circuit may be, for example, a functional representation of a quantum circuit, a logical quantum circuit, or the like.

On Step 130b a first mapping may be obtained. The first mapping may be generated by the compiler that is utilized on Step 120b. The first mapping may map a code artifact of the quantum program to a circuit component in the intermediate quantum circuit.

On Step 132b, the intermediate quantum circuit may be transpiled to a quantum circuit. For example, a functional-level quantum circuit may be transpiled into a gate-level quantum circuit. As another example, a logical quantum circuit may be transpiled into a physical quantum circuit. As yet another example, a non-executable quantum circuit may be transpiled into an executable quantum circuit.

On Step 134b, a second mapping may be obtained. The second mapping may be generated by the traspiler that is utilized on Step 132b. The second mapping may map a circuit component of the intermediate quantum circuit to a circuit component in the quantum circuit.

On Step 136b, an aggregated mapping may be created based on the first mapping and the second mapping. The aggregated mapping may map a code artifact in the quantum program to a circuit component in the quantum circuit. A circuit component in the quantum circuit may be mapped to the code artifact if the circuit component is mapped, in the second mapping, to an intermediate component in the intermediate quantum circuit that is mapped, in the first mapping, to the code artifact.

Figure 1C:
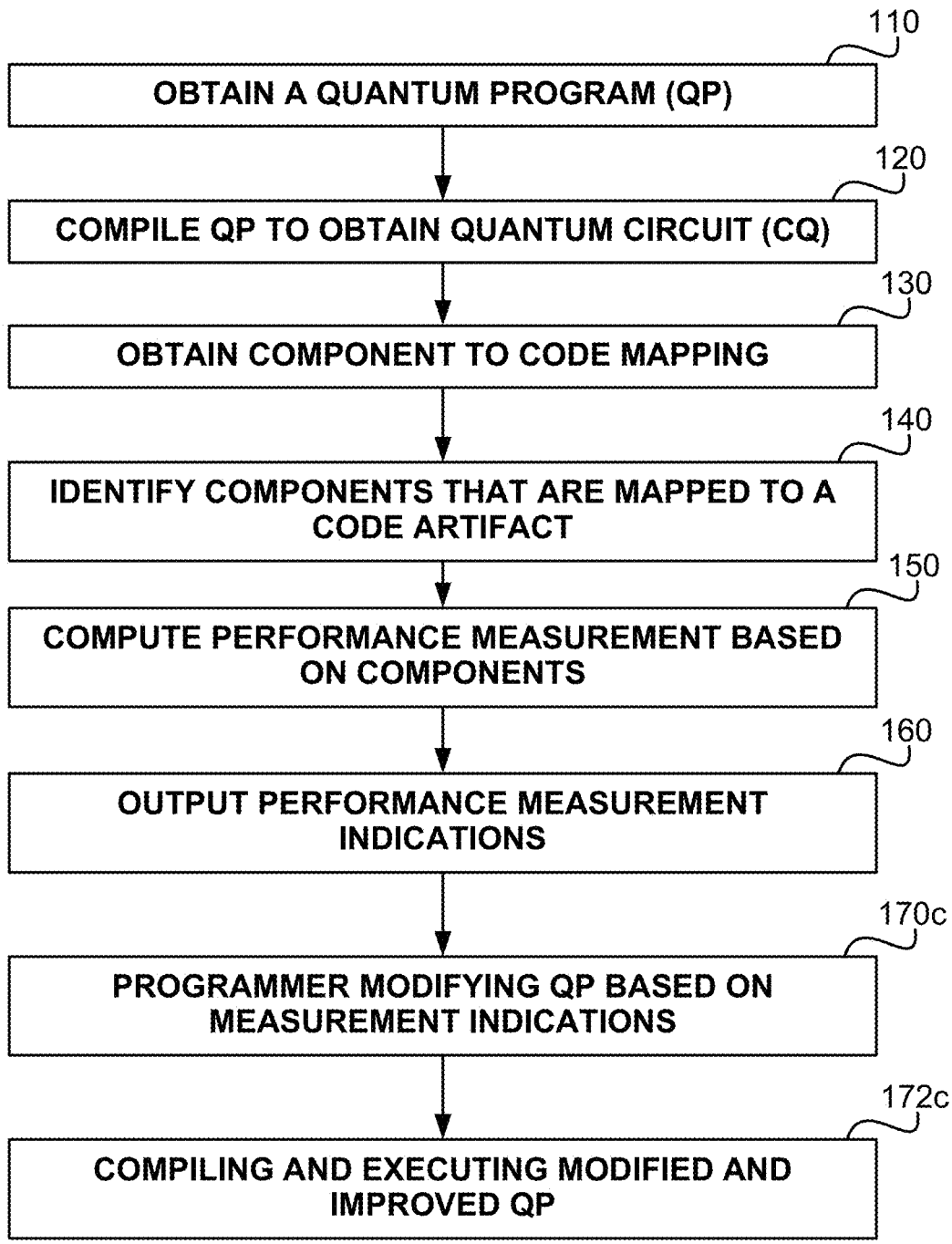
FIG. 1C illustrates an exemplary flowchart diagram of a method, in accordance with some exemplary embodiments of the disclosed subject matter.

Referring now to FIG. 1C, showing an exemplary flowchart diagram of a method, in accordance with some exemplary embodiments of the disclosed subject matter.

On Step 170c, the programmer may utilize the performance measurement indications to modify the quantum program. The quantum program may be updated and modified so as to potentially improve its performance, such as by reducing the depth of the quantum circuit, reducing the number of qubits required, improving accuracy, reducing the number of gates utilized, or the like.

In some cases, the programmer may wish to re-measure the performance of the updated quantum program, and Steps 120-160 may be performed with respect to the modified quantum program.

On Step 172c, the modified quantum program may be executed. In some exemplary embodiments, the modified quantum program may first be compiled to obtain an executable quantum circuit. Additionally or alternatively, the executable quantum circuit may be available as part of the performance analysis performed with respect to the modified quantum program. In some exemplary embodiments, the modified quantum program may be executed on a quantum computer. It is noted that Steps 110-170c may be performed without the use of a quantum computer and using classic computer.

Figure 2:
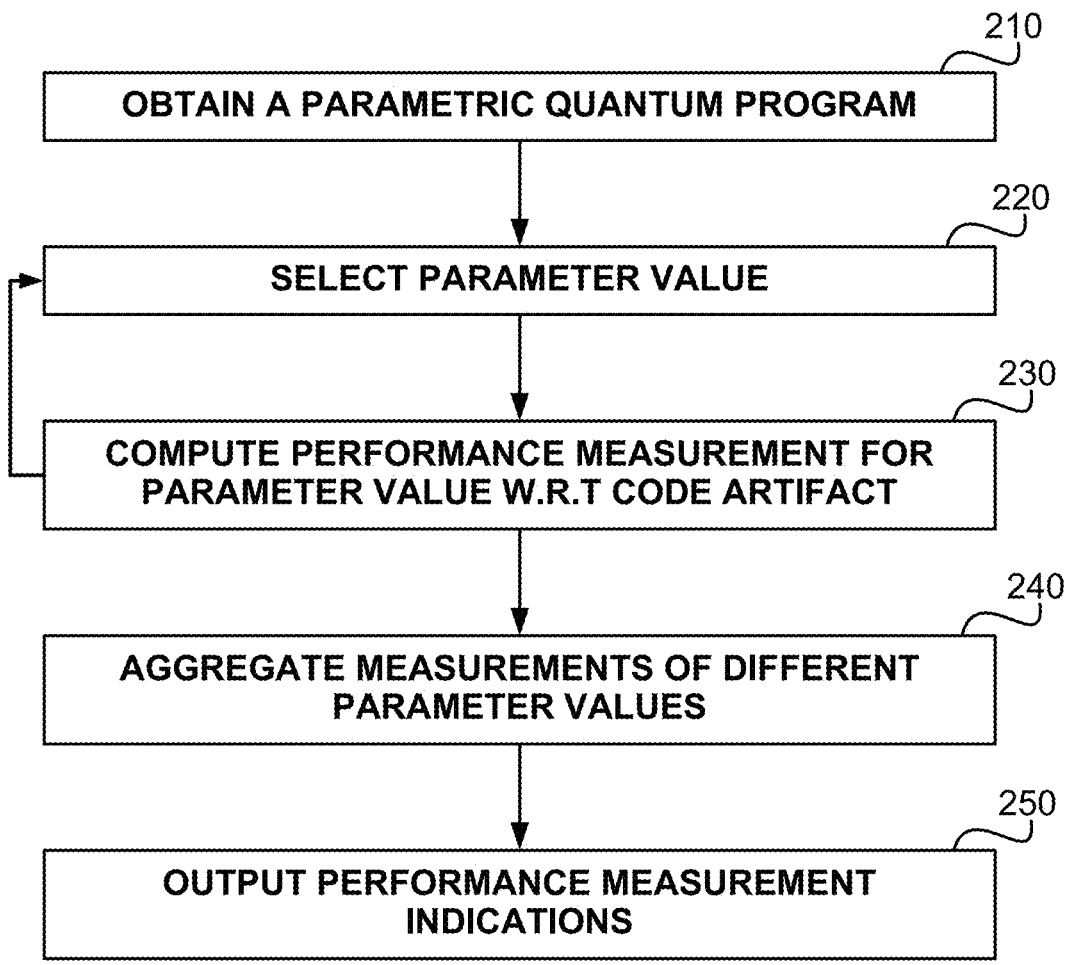
FIG. 2 illustrates an exemplary flowchart diagram of a method, in accordance with some exemplary embodiments of the disclosed subject matter.

Referring now to FIG. 2, showing an exemplary flowchart diagram of a method, in accordance with some exemplary embodiments of the disclosed subject matter.

On Step 210, a parametric quantum program is obtained. The parametric quantum program may be obtained in a similar manner to how a quantum program is obtained in Step 110 of FIG. 1A. The parametric quantum program may be a program which is configured to receive a value for a parameter, which may affect its outcome. It is noted that depending on the parameter value, different circuits may be implemented, some aspects may be optimized and removed, or the like.

On Step 220, a value may be selected for the parameter. The value may be selected deterministically, non-deterministically, automatically, manually, or the like. In some exemplary embodiments, the value may be selected from a pre-existing domain of potential values of the parameter. In some exemplary embodiments, the parameter value may be selected using a distribution of values that is to be utilized when the parametric quantum program is executed on the quantum computer.

On Step 230, the parameter value may be injected into the quantum program or a quantum circuit synthesized therefrom, yielding a value-specific representation of the parametric quantum program. Performance measurement of the value-specific representation of the parametric quantum program may be computed, such as by employing the method illustrated in FIG. 1A-1C.

Steps 220-230 may be repeated several times, each time with respect to a different parameter value.

On Step 240, different performance measurements of different value-specific representations may be aggregated to determine performance measurement of the parametric quantum program. For example, a code artifact in the parametric quantum program may be determined to be related to 5 qubits in a first value-specific representation, 7 qubits in a second value-specific representation, and to 90 qubits in a third value-specific representation. The aggregated measurement may be an average measurement (e.g., 34), a minimal value (e.g., 5), a maximal value (e.g., 90), a mean value, media value, or any other aggregative function that are based on a value series.

On Step 250, the performance measurement indication(s) may be outputted, similarly to the output provided in Step 160 of FIG. 1A. In some exemplary embodiments, the output may indicate the aggregated performance measurement, as well as the concrete performance measurements in different values.

Figure 3:
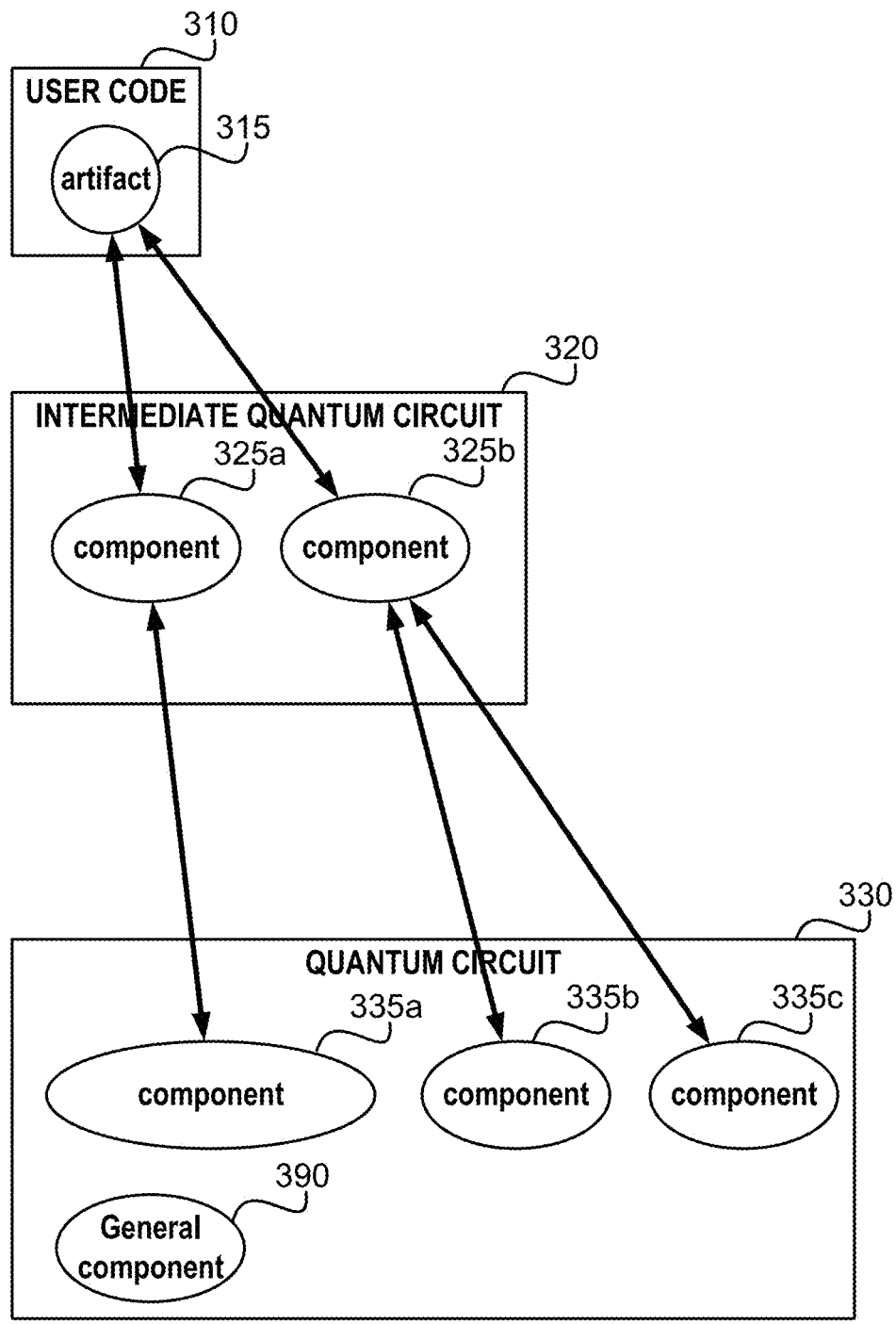
FIG. 3 illustrates an exemplary diagram of a mapping, in accordance with some exemplary embodiments of the disclosed subject matter.

Referring now to FIG. 3, illustrating an exemplary diagram of a mapping, in accordance with some exemplary embodiments of the disclosed subject matter.

Quantum Program 310 may be composed of user code, including one or more artifacts. FIG. 3 focuses on a single artifact: Artifact 315. An Intermediate Quantum Circuit 320 may be generated by a compiler (not shown) compiling Quantum Program 310. The compiler may synthesize Components 325a, 325b based on Artifact 315, and indicate their association, e.g., using a component to artifact mapping. Quantum Circuit 330 may be generated by a transpiler (not shown) transpiling Intermediate Quantum Circuit 320. Components in Quantum Circuit 330 may be mapped, e.g., using a component to component mapping, to a component in Intermediate Quantum Circuit 320. As an example, Component 335a may be mapped to Component 325a, while Components 335b, 335c may be mapped to Component 325b.

As can be appreciated, using the mappings, performance measurement of Artifact 315 may be measured. Using the first mapping, performance may be measured at the intermediate quantum circuit level, based on the two mapped components (which may or may not differ from one another). Using an aggregated mapping of the first and second mappings, performance may be measured at the quantum circuit level, such as based on performance attributes associated with Components 335a, 335b, 335c, which are mapped back to Artifact 315.

It is noted that in some embodiments, some components, such as General Component 390 may be synthesized within a quantum circuit (at any abstraction level), without being directly attributable to any code artifact. Performance impact of such components may be disregarded in the analysis. Additionally or alternatively, performance impact of such components may be shared amount other user artifacts equally, unequally, proportionally, or the like.

Figure 4:
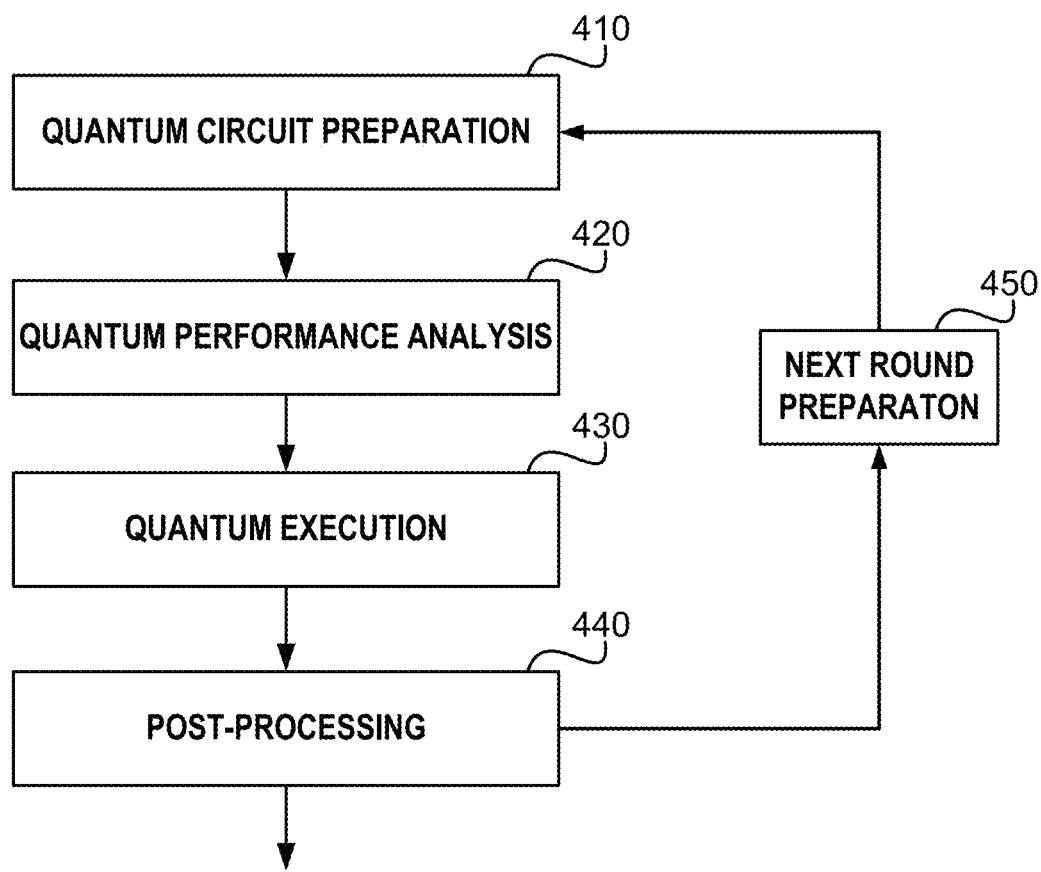
FIG. 4 illustrates an exemplary flowchart diagram of a method, in accordance with some exemplary embodiments of the disclosed subject matter.

Referring now to FIG. 4, showing an exemplary flowchart diagram of a method, in accordance with some exemplary embodiments of the disclosed subject matter. FIG. 4 relates to a hybrid computer program, in which a classical computer prepares a quantum circuit (410), performance analysis is performed using the classical computer and regardless of the execution of the quantum circuit (420), the quantum circuit is executed using a quantum computer (430), and the outcome of the quantum execution is processed (440). Based on the post-processing, it may be determined whether to prepare a next round of quantum execution (450) or provide an output.

In some exemplary embodiments, multiple executions may be performed, such as using some hill climbing or other search techniques. In some exemplary embodiments, analysis may be performed on all rounds, and performance may be aggregated (e.g., similarly to the aggregation exemplified in FIG. 2). Additionally or alternatively, performance in a single representative round may be utilized.

In some exemplary embodiments, in a hybrid computer program, quantum program code may be generated on the fly and during execution. However, after the quantum program is generated, such program may be analyzed in a static manner. In some exemplary embodiments, the static analysis may be generally simple and faster than the generation or the execution.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), electrical signals transmitted through a wire. Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method comprising:
    obtaining a quantum program, wherein the quantum program comprises a plurality of code artifacts, the quantum program is compilable into a quantum circuit;
    obtaining a representation of the quantum circuit that implements the quantum program, the quantum circuit comprising circuit components, the circuit components comprising a plurality of quantum gates manipulating a plurality of qubits over a plurality of cycles;
    obtaining a circuit component-to-code mapping, the circuit component-to-code mapping maps the circuit components of the representation of the quantum circuit to respective code artifacts of the quantum program, thereby attributing the circuit components to their origin in the quantum program, wherein the circuit component-to-code mapping comprises at least a mapping of a sub-circuit of the quantum circuit to a code artifact of the code artifacts, the sub-circuit comprising one or more gates of the plurality of quantum gates manipulating one or more qubits of the plurality of qubits, wherein the sub-circuit is assigned to at least one of: implementing the code artifact or assisting in implementing the code artifact;
    automatically measuring a performance of the code artifact of the quantum program on a quantum computer, thereby obtaining a measurement of the performance of the code artifact, said measuring is performed based on one or more circuit components of the sub-circuit that are mapped to the code artifact by the circuit component-to-code mapping; and
    outputting the measurement of the performance of the code artifact on the quantum computer.

2. The method of claim 1, wherein the representation of the quantum circuit is a non-executable representation of the quantum circuit, wherein said automatically measuring the performance is performed without executing the quantum circuit.

3. The method of claim 1, wherein the circuit component-to-code mapping comprises a second mapping of the sub-circuit to a second code artifact of the code artifacts.

4. The method of claim 1, wherein the quantum circuit comprises general circuit components assigned for memory management, the general circuit components are not attributed to any of the code artifacts, wherein the circuit components and the circuit component-to-code mapping exclude the general circuit components.

5. The method of claim 1, wherein the circuit component-to-code mapping comprises a second mapping of a second sub-circuit to the code artifact of the quantum program, wherein the code artifact of the quantum program is included in a loop in the quantum program, the representation of the quantum circuit comprises a plurality of circuit components representing the code artifact in different iterations of the loop, the plurality of circuit components comprising at least the sub-circuit and the second sub-circuit, wherein the performance is computed based on the plurality of circuit components that represent the code artifact in the different iterations of the loop.

6. The method of claim 1 further comprises compiling the quantum program to obtain the representation of the quantum circuit, wherein said compiling comprises creating the circuit component-to-code mapping.

7. The method of claim 1 further comprises:
compiling the quantum program to obtain an intermediate representation of the quantum circuit;
transpiling the intermediate representation to obtain the representation of the quantum circuit;
wherein said obtaining the circuit component-to-code mapping includes:
obtaining a first mapping created during the compilation of the quantum program, the first mapping maps circuit components in the intermediate representation to respective code artifacts of the quantum program;
obtaining a second mapping created during the transpilation of the intermediate representation of the quantum circuit, the second mapping maps circuit components in the representation of the quantum circuit to respective circuit components in the intermediate representation; and
aggregating the first mapping and the second mapping.

8. The method of claim 1, wherein the performance of the code artifact of the quantum program is measured based on at least one of:
a number of gates in the sub-circuit;
a number of gates of a specific type in the sub-circuit;
a number of qubits allocated in the sub-circuit;
a depth of the sub-circuit;
a number of auxiliary qubits that are used and subsequently cleaned, by the sub-circuit;
a number of auxiliary qubits that are used and not cleaned, by the sub-circuit;
an error measurement attributed to the sub-circuit;
whether the sub-circuit affects a length of a critical path of the quantum circuit.

9. The method of claim 1, wherein the performance measurement of the code artifact is further based on one or more additional circuit components that are associated with the one or more circuit components, wherein the one or more circuit components are assigned to implement the code artifact, and the one or more additional circuit components are assigned to assist in implementing the code artifact.

10. The method of claim 9, wherein the one or more additional circuit components comprise at least one of:

an error correction sub-circuit with respect to a qubit utilized by the one or more circuit components;
a swapping sub-circuit with respect to a qubit utilized by the one or more circuit components; and
an uncomputation sub-circuit with respect to an auxiliary qubit utilized by the one or more circuit components.

11. The method of claim 1, wherein said outputting includes displaying the performance measurement to a programmer; wherein said method further comprises: receiving a modified quantum program from the programmer, whereby the programmer potentially improves the performance measurement while retaining functionality of the quantum program.

12. The method of claim 1, wherein the quantum circuit is a parametric quantum circuit, wherein said automatically measuring the performance measurement of the code artifact comprises performing a plurality of performance measurements with respect to a plurality of different parameter values, whereby obtaining a plurality of measurements, wherein the performance measurement of the code artifact is computed based on an aggregation of the plurality of measurements.

13. The method of claim 1, wherein the quantum program is part of an hybrid computer program comprising a classic program and the quantum program, wherein the classic program is configured to dynamically generate a version of the quantum program, wherein performance measurements of the code artifact are computed individually to each quantum program that is generated by the classic program, whereby obtaining a plurality of measurements, wherein the performance measurement of the code artifact is computed based on an aggregation of the plurality of measurements.

14. An apparatus comprising a processor and coupled memory, said processor being adapted to perform:
obtaining a quantum program, wherein the quantum program comprises a plurality of code artifacts, the quantum program is compilable into a quantum circuit;
obtaining a representation of the quantum circuit that implements the quantum program, the quantum circuit comprising circuit components, the circuit components comprising a plurality of quantum gates manipulating a plurality of qubits over a plurality of cycles;
obtaining a circuit component-to-code mapping, the circuit component-to-code mapping maps the circuit components of the representation of the quantum circuit to respective code artifacts of the quantum program, thereby attributing the circuit components to their origin in the quantum program, wherein the circuit component-to-code mapping comprises at least a mapping of a sub-circuit of the quantum circuit to a code artifact of the code artifacts, the sub-circuit comprising one or more gates of the plurality of quantum gates manipulating one or more qubits of the plurality of qubits, wherein the sub-circuit is assigned to at least one of: implementing the code artifact or assisting in implementing the code artifact;
automatically measuring a performance of the code artifact of the quantum program on a quantum computer, thereby obtaining a measurement of the performance of the code artifact, said measuring is performed based on one or more circuit components of the sub-circuit that are mapped to the code artifact by the circuit component-to-code mapping; and
outputting the measurement of the performance of the code artifact on the quantum computer.

15. The apparatus of claim 14, wherein the representation of the quantum circuit is a non-executable representation of the quantum circuit, wherein said apparatus is configured to automatically measure the performance without executing the quantum circuit.

16. The apparatus of claim 14, wherein the processor is configured to compile the quantum program to obtain the representation of the quantum circuit, wherein during the compilation of the quantum program, the circuit component-to-code mapping is created.

17. The apparatus of claim 14, wherein the memory retains a compiler and a transpiler, wherein the compiler is configured to compile the quantum program, thereby obtaining an intermediate representation of the quantum circuit, wherein the transpiler is configured to transpile the intermediate representation, thereby obtaining the representation of the quantum circuit; wherein the circuit component-to-code mapping is obtained by aggregating a first mapping and a second mapping, wherein the first mapping is created during the compilation of the quantum program, the first mapping maps circuit components in the intermediate representation to respective code artifacts of the quantum program; the second mapping is created during the transpilation of the intermediate representation of the quantum circuit, the second mapping maps circuit components in the representation of the quantum circuit to respective circuit components in the intermediate representation.

18. The apparatus of claim 14, wherein the performance measurement of the code artifact of the quantum program is further based on one or more additional circuit components that are associated with the one or more circuit components, wherein the one or more circuit components are assigned to implement the code artifact, and the one or more additional circuit components are assigned to assist in implementing the code artifact.

19. The apparatus of claim 14, wherein the quantum circuit is a parametric quantum circuit, wherein said automatically measuring the performance of the code artifact comprises performing a plurality of performance measurements with respect to a plurality of different parameter values, whereby obtaining a plurality of measurements, wherein the performance measurement of the code artifact is computed based on an aggregation of the plurality of measurements.

20. A computer program product comprising a non-transitory computer readable medium retaining program instructions, which program instructions when read by a processor, cause the processor to perform a method comprising:
 obtaining a quantum program, wherein the quantum program comprises a plurality of code artifacts, the quantum program is compilable into a quantum circuit;
 obtaining a representation of the quantum circuit that implements the quantum program, the quantum circuit comprising circuit components, the circuit components comprising a plurality of quantum gates manipulating a plurality of qubits over a plurality of cycles;
 obtaining a circuit component-to-code mapping, the circuit component-to-code mapping maps the circuit components of the representation of the quantum circuit to respective code artifacts of the quantum program, thereby attributing the circuit components to their origin in the quantum program, wherein the circuit component-to-code mapping comprises at least a mapping of a sub-circuit of the quantum circuit to a code artifact of the code artifacts, the sub-circuit comprising one or more gates of the plurality of quantum gates manipulating one or more qubits of the plurality of qubits, wherein the sub-circuit is assigned to at least one of: implementing the code artifact or assisting in implementing the code artifact;
 automatically measuring a performance of the code artifact of the quantum program on a quantum computer, thereby obtaining a measurement of the performance of the code artifact, said measuring is performed based on one or more circuit components of the sub-circuit that are mapped to the code artifact by the circuit component-to-code mapping; and
 outputting the measurement of the performance of the code artifact on the quantum computer.

\* \* \* \* \*